United States Patent
Fukuzawa

(10) Patent No.: US 7,440,151 B2
(45) Date of Patent: Oct. 21, 2008

(54) IMAGE READING APPARATUS

(75) Inventor: Nobumasa Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1091 days.

(21) Appl. No.: 10/660,506

(22) Filed: Sep. 12, 2003

(65) Prior Publication Data

US 2004/0057088 A1 Mar. 25, 2004

(30) Foreign Application Priority Data

Sep. 20, 2002 (JP) .............................. 2002-275508

(51) Int. Cl.
*H04N 1/46* (2006.01)
*H04N 1/04* (2006.01)
(52) U.S. Cl. .................................. 358/509; 358/474
(58) Field of Classification Search ................ 358/509, 358/474, 1.1, 1.6, 1.7, 1.9, 510, 475, 480, 358/484, 486, 493, 494, 496, 497, 491, 489, 358/487, 505, 506, 488; 399/4, 7, 361, 363, 399/365
See application file for complete search history.

(56) References Cited

U.S. PATENT DOCUMENTS

| | | | |
|---|---|---|---|
| 5,283,698 A | 2/1994 | Fukuzawa et al. | 359/896 |
| 5,412,201 A | 5/1995 | Fukuzawa et al. | 250/208.1 |
| 5,612,811 A * | 3/1997 | Aikawa et al. | 359/204 |
| 5,854,688 A | 12/1998 | Fukuzawa | 358/296 |
| 6,032,009 A | 2/2000 | Fukuzawa et al. | 399/198 |

FOREIGN PATENT DOCUMENTS

JP 7-23226 1/1995

* cited by examiner

*Primary Examiner*—Dov Popovici
(74) *Attorney, Agent, or Firm*—Fitzpatrick, Cella, Harper & Scinto

(57) ABSTRACT

Disclosed is an image reading apparatus in which the amount of illumination light is increased and adverse influence of reflective illumination is reduced, and which is capable of reading image information of an original, such as a document, with high precision. The image reading apparatus includes an illuminating unit for illuminating image information of the original placed on an original support, and an image forming unit for imaging the image information on a reading unit. In the image reading apparatus, the illuminating unit includes a plurality of light source portions, the image information is read in a two-dimensional manner by changing a relative position between the image information and the reading unit, and the plurality of light source portions are disposed asymmetrically with respect to an optical axis of the image forming unit in a sub-scanning cross-sectional plane.

2 Claims, 2 Drawing Sheets

IMAGE READING APPARATUS

BACKGROUND OF THE INVENTION

1. Field of the Invention

The present invention relates to an image reading apparatus, and particularly to an image reading apparatus provided with an original illuminating system in which light source portions (illuminating light sources) for illuminating an original, such as a document, are disposed on both sides of an optical axis of an image forming unit.

2. Related Background Art

In an original illuminating system of a conventional image reading apparatus, two light source portions 23 and 24 for illuminating an original are disposed on both sides of an optical axis S of an image forming lens 28 as illustrated in FIG. 3, for example. Those light source portions 23 and 24 are comprised of elongate fluorescent lamps, xenon lamps, LED arrays, or the like, respectively, and illuminate image information of an original 21, such as a document, placed on an object table glass 22 from both sides of the optical axis S when turned on simultaneously.

Optical path of light reflected by the illuminated original 21 is deflected by first, second and third reflective mirrors 25, 26 and 27 in an apparatus body. The light is imaged on a solid pickup device 29, such as a CCD, by the image forming lens 28, and the image information of the original is read in a tow-dimensional manner.

A principal reason for using two light source portions 23 and 24 as the original illuminating system as discussed above is that the amount of illumination light for illuminating the original 21 needs to be increased. Even in a conventional original illuminating system including a single light source portion, the amount of illumination light can be increased by arranging a reflecting portion at a location facing the light source portion. It is, however, difficult to increase the amount of illumination light up to such a level as is equal to that of the original illuminating system including two light source portions which are to be simultaneously lighted.

The amount of light reflected by the original 21 increases as the amount of illumination light increases, and the amount of light of the original image formed on the solid pick-up device 29, such as the CCD, is accordingly increased. Resultantly, its output signal is increased, and noise of the image information is hence reduced. It is thus possible to read the image information with higher image quality.

The original illuminating system used in the conventional image reading apparatus as illustrated in FIG. 3, however, has the following disadvantage.

Although conventionally not described clearly, two light source portions 23 and 24 are normally disposed at optimal locations in the light of a space given to the original illuminating system, respectively. Therefore, those light source portions are disposed at symmetrical locations with respect to the optical axis S of the image forming lens 28 as illustrated in FIG. 3.

However, when the two light source portions 23 and 24 are disposed at symmetrical locations with respect to the optical axis S as illustrated in FIG. 3, the following phenomenon occurs. Illumination light N of the original 21 from one light source portion 23 is diffused and reflected by the original 21. Since the other light source portion 24 is disposed at a location in a path along a specular or regular reflection direction of that reflected light, a strong reflective component L of the reflected light enters an opening portion 24a of the light source portion 24. This incident light is diffused in the light source portion 24, and diffused light M once again illuminates the original 21. Accordingly, image information is degraded due to the density of the original 21, and so-called reflective illumination is thus increased. This phenomenon holds with respect to the other light source portion 24.

The above-discussed reflective illumination is the phenomenon in which light for illuminating an original is diffused by the original which normally has a diffusing surface, and the diffused light is returned to the original illuminating system, and once again illuminates the original (see Japanese Patent Application Laid-Open No. 7-23226, for example).

Therefore, the reflectance (density) of the original is influenced by the reflectance of itself (the original). This influence can be expressed by the fact that the output S of the solid pick-up device, such as the CCD, is not only proportional to the reflectance R of the original, but also influenced by higher order factors of the reflectance R, which is written as $$S \propto R + \alpha R^2 + \beta R^3 + \ldots$$

Thus, the signal of the reflectance R is adversely influenced by unwanted components, and it is difficult to obtain accurate information of the reflectance (density) of the original. Accordingly, the original illuminating system is required to have such a structure that the reflective illumination component can be reduced as much as possible.

However, when two light source portions 23 and 24 of the original illuminating system are disposed symmetrically with respect to the optical axis S of the image forming lens 28 as discussed above, the reflective illumination component increases since a strong specular reflection component of the illumination light for the original form one of the light source portions enters the other light source portion. Hence, reading precision of image information of the original is likely to lower.

SUMMARY OF THE INVENTION

It is an original of the present invention to provide an image reading apparatus in which the amount of illumination light is increased and at the same time adverse influence of reflective illumination is reduced, and which is capable of reading image information of an original with high precision.

According to one aspect of the present invention, there is provided an image reading apparatus which includes an illuminating unit for illuminating image information of an original placed on an original support, and an image forming unit for imaging the image information on a reading unit. In the image reading apparatus, the illuminating unit includes a plurality of light source portions, the image information is read in a two-dimensional manner by changing a relative position between the image information and the reading unit, and the plurality of light source portions are disposed asymmetrically with respect to an optical axis of the image forming unit in a sub-scanning cross-sectional plane.

Based on the above fundamental construction of the image reading apparatus, the following more specific structures can be used.

The plurality of light source portions can be adapted to be simultaneously lighted, and illuminate the image information.

The plurality of light source portions can have the same shape or/and the same illumination characteristics.

According to another aspect of the present invention, there is provided an image reading apparatus which includes an illuminating unit for illuminating image information of an original placed on an original support, and an image forming unit for imaging the image information on a reading unit. In the image reading apparatus, the illuminating unit includes a plurality of light source portions, and a plurality of reflective portions provided corresponding to the plurality of light source portions and adapted to reflect light from the light source portions toward a side of the image information, respectively, the image information is read in a two-dimensional manner by changing a relative position between the image information and the reading unit, and the plurality of reflective portions are disposed asymmetrically with respect to an optical axis of the image forming unit in a sub-scanning cross-sectional plane.

Also based on the above fundamental construction of the image reading apparatus, the following more specific structures can be used.

The plurality of light source portions can be disposed asymmetrically with respect to the optical axis of the image forming unit in the sub-scanning cross-sectional plane.

The plurality of light source portions can be adapted to be simultaneously lighted, and illuminate the image information.

The plurality of light source portions can have the same shape or/and the same illumination characteristics.

The plurality of reflective portions can have mutually different shapes.

These and further aspects and features of the invention will become apparent from the following detailed description of preferred embodiments thereof in conjunction with the accompanying drawings.

DESCRIPTION OF THE PREFERRED EMBODIMENTS

First Embodiment

Figure 1:
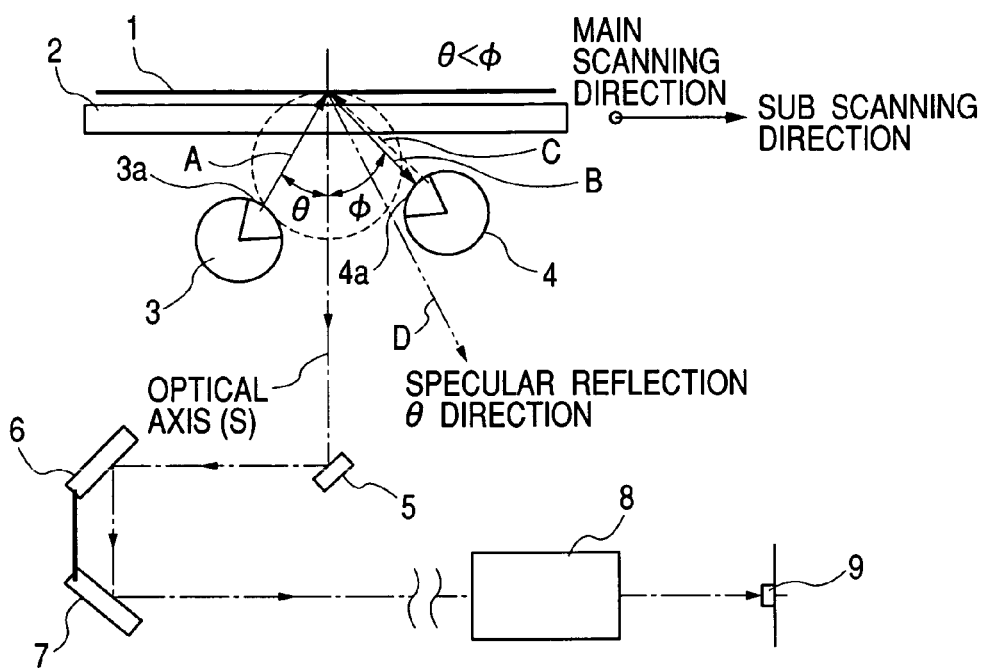
FIG. 1 is a schematic view illustrating a main portion of an image reading apparatus of a first embodiment according to the present invention.

FIG. 1 is a schematic view illustrating a main portion of an image reading apparatus of a first embodiment according to the present invention. In FIG. 1, reference numeral 2 designates an original support (an original object table glass), and image information of an original 1 is placed on the support 1. Reference numerals 3 and 4 designate light source portions (illuminating light sources) serving as illuminating units, respectively. Each of the light source portions 3 and 4 is comprised of an elongate fluorescent lamp, a xenon lamp, an LED array, or the like. Those light source portions 3 and 4 are disposed at asymmetrical locations with respect to the optical axis S of an imaging unit 8 (described later) in a sub-scanning cross-sectional plane. Those two light source portions 3 and 4 have the same shape or/and the same illumination characteristics. The illumination characteristics mean spectral characteristics, luminance characteristics, radiation distribution characteristics, and the like. In the first embodiment, the light source portions 3 and 4 illuminate image information of the original 1 from both sides of the optical axis S when lighted simultaneously.

Reference numerals 5, 6 and 7 designate first, second and third reflective mirrors, respectively, and these reflective mirrors 5, 6 and 7 deflect the optical path of light from the original 1 in an apparatus body. Reference numeral 8 designates an image forming lens (a lens for reading the original 1) serving as the imaging unit, and the image forming lens 8 images light, which is created based on the image information of the original 1, on the surface of a reading unit 9. Reference numeral 9 designates a line sensor (CCD) serving as the reading unit, and the line sensor 9 reads image information in a two-dimensional manner when the relative position between the line sensor 9 and the image information of the original 1 is changed.

In the first embodiment, the image information of the original 1 is illuminated from both sides of the optical axis S by simultaneously-radiated light from the two light source portions 3 and 4, and the optical path of light reflected by the illuminated original 1 is deflected by the first, second and third reflective mirrors 5, 6 and 7 in the apparatus body. The light is imaged on the surface of the CCD 9 by the image forming lens 8. The image information of the original 1 is read in a tow-dimensional manner when scanning in a main scanning direction is electrically performed while the first, second and third reflective mirrors 5, 6 and 7 are moved in the sub-scanning direction. Here, the distance between the original 1 and the CCD 9 remains unchanged by moving the second and third reflective mirrors 6 and 7 by a half of the moving amount of the first reflective mirrors 5.

In the first embodiment, the light source portions 3 and 4 are disposed such that the position of the light source portion 4 is away from a path along a specular reflection θ direction relative to an incident angle θ on the original 1 of illumination light A illuminating the original 1 through an opening portion 3a of the light source portion 3. Accordingly, reflection light B of a weak reflective component, but not reflection light D of a strong reflective component reflected in the specular reflection θ direction by the original 1, enters an opening portion 4a of the light source portion 4. This incident light is diffused in the light source portion 4, and light C of the diffused light illuminates the original 1 once again. Therefore, the amount of light influencing the reflective illumination can be reduced.

It is likewise possible to reduce the amount of light influencing the reflective illumination since the light source portion 3 is not located in a path along a specular reflection θ direction of illumination light for illuminating the original 1 from the light source portion 4.

Further, in the first embodiment, it is possible to reduce a component which once enters the other light source portion from one light source portion and then illuminates the original 1 once again. Accordingly, it is also possible to reduce light which again enters the one light source portion and becomes a reflective illumination component, and hence adverse influence of the reflective illumination can be further reduced.

Further, in the first embodiment, two light source portions 3 and 4 are simultaneously lighted as discussed above to increase the amount of illumination light, and at the same time the reflective illumination is reduced. Image information of the original 1 is thus read with high precision.

Furthermore, in the first embodiment, one central angle θ of light from one of the light source portions illuminating the original 1 is set to be in a range of smaller acute angles (from 10 degrees to 25 degrees), and the other central angle φ is set to be in a range of larger acute angles (from 20 degrees to 50 degrees). In other words, one light source portion 3 illuminates the original 1 at smaller acute angles, and the other light source portion 4 illuminates the original 1 at larger acute angles. Accordingly, the other light source portion 4 is positioned relatively away from the optical axis S, and tends to increase the space of the illuminating system, while the one light source portion 3 is positioned relatively close to the optical axis S, and tends to decrease the space of the illuminating system. Therefore, the first embodiment can be constructed substantially without increasing the overall space of the original illuminating system.

In the first embodiment, the light source portions 3 and 4 illuminate the original 1 at smaller acute angles and at larger acute angles, respectively, but this arrangement can be reversed.

Further, in such a kind of image reading apparatus, a case where the original 1, such as a curled paper, may slightly lift from the object table glass 2 due to a weak hold-down force can occur. In the first embodiment, a decrease in the amount of illumination light due to such lift of the paper can be suppressed since one central angle θ of light for illuminating the original 1 is set to be in the range of smaller acute angles.

Further, since the other central angle φ of light for illuminating the original 1 is set to be in the range of larger acute angles, an original illumination distribution in the sub-scanning direction is widened on the object table glass 2. Accordingly, it is possible to reduce variations in the amount of illumination light due to errors in the sub-scanning direction caused by deviation in a reading position of the CCD or the like.

As described in the foregoing, in the first embodiment, two light source portions 3 and 4 are asymmetrically disposed with respect to the optical axis S, and are arranged such that the position of each light source portion is deviated from the path along the specular reflection θ direction (a direction in which illumination light is strongly reflected) of illumination light from the other light source portion. Accordingly, the amount of illumination light can be increased, and at the same time adverse influence of the reflective illumination can be reduced. Image information of the original 1 can hence be read with high precision.

Although two light source portions 3 and 4 are asymmetrically disposed with respect to the optical axis S in the first embodiment, the number of light source portions can be more than two. For example, in the case of three light source portions, it is possible to dispose one light source portion on one side of the optical axis S, and dispose two light source portions asymmetrically relative thereto.

Figure 4:
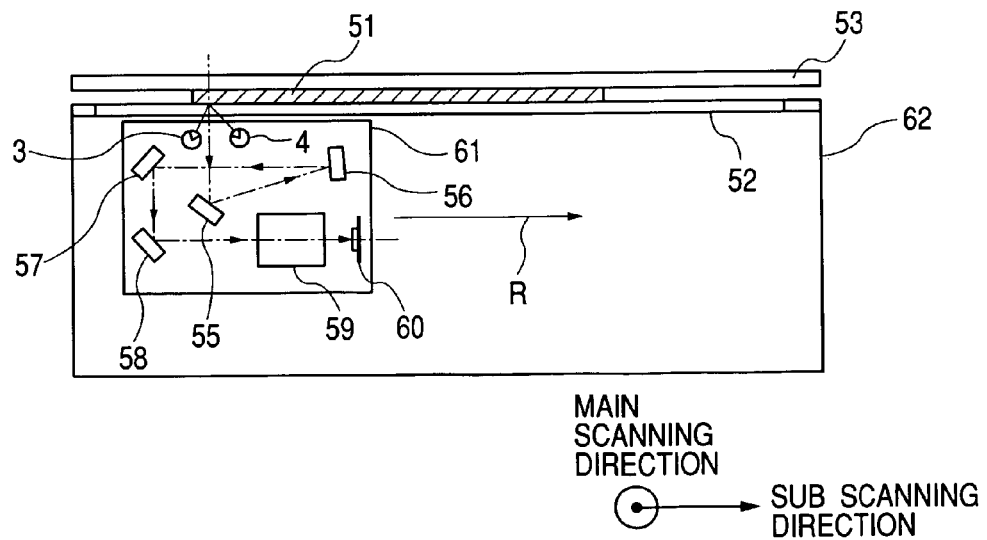
FIG. 4 is a schematic view illustrating a main portion of an image reading apparatus according to the present invention.

Further, the first embodiment is directed to the image reading apparatus having a 1:2 scanning optical system, but the present invention can also be applied to an image reading apparatus of a united unit type (a flat bed type) as illustrated in FIG. 4, for example, with the same effect as that of the first embodiment.

In FIG. 4, image information of an original 51 is illuminated by simultaneously-radiated light from two light source portions 3 and 4, and the optical path of light reflected by the illuminated original 51 is deflected by first, second, third and fourth reflective mirrors 55, 56, 57 and 58 in a carriage 61. The light is imaged on the surface of a linear image sensor 60, such as a linear CCD, by an image forming lens 59. The image information of the original 51 is read in a tow-dimensional manner by moving the carriage 61 in a direction (the sub-scanning direction) of arrow R illustrated in FIG. 4 using a sub-scanning motor (not shown). Here, the linear CCD 60 is comprised of a plurality of light receiving elements arranged linearly (in the main scanning direction).

Second Embodiment

Figure 2:
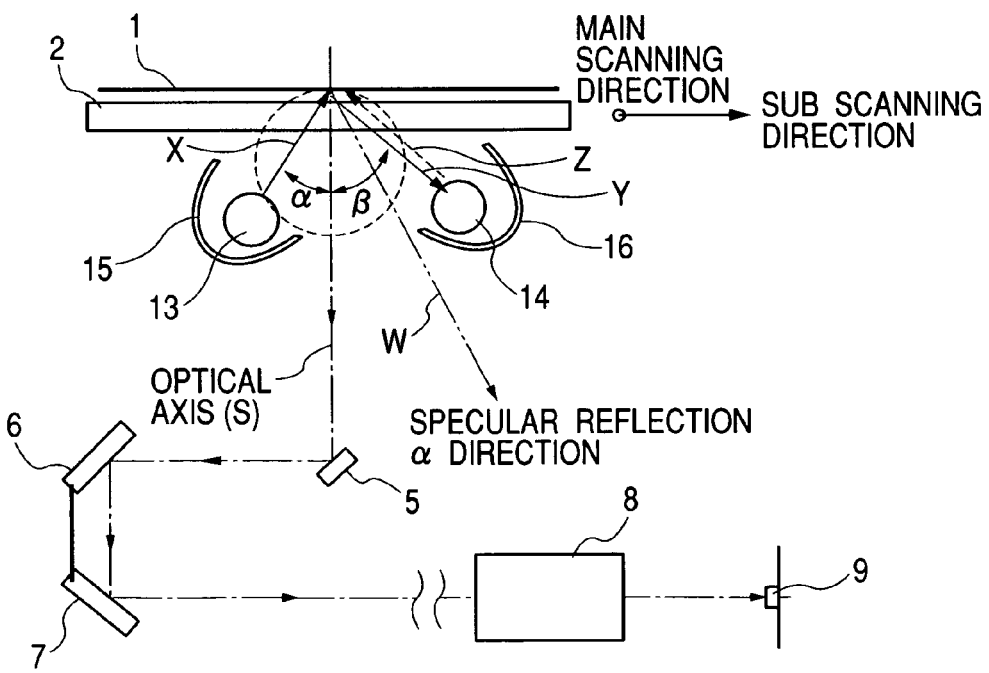
FIG. 2 is a schematic view illustrating a main portion of an image reading apparatus of a second embodiment according to the present invention.
Figure 3:
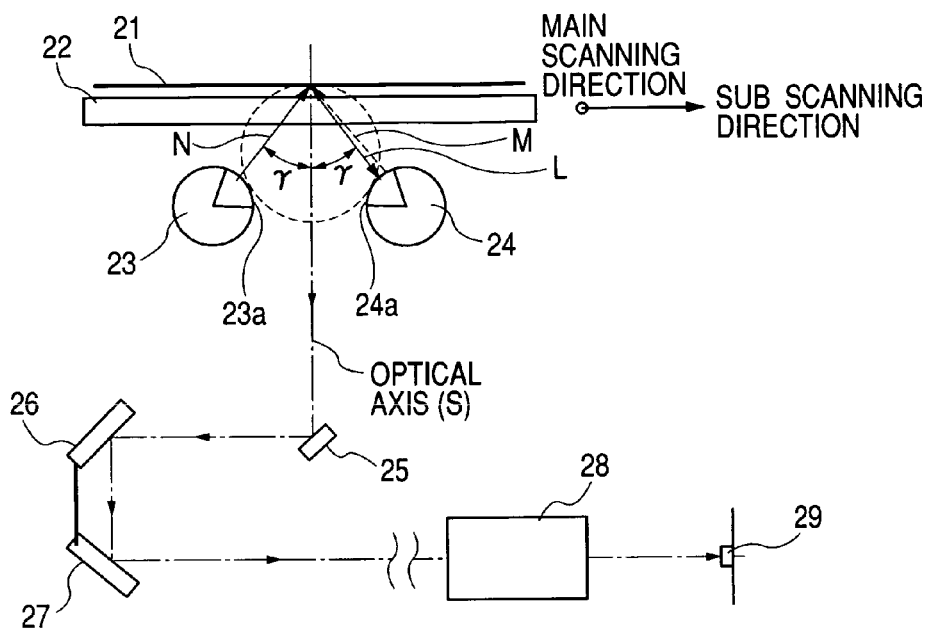
FIG. 3 is a schematic view illustrating a conventional image reading apparatus.

FIG. 2 is a schematic view illustrating a main portion of an image reading apparatus of a second embodiment according to the present invention. In FIG. 2, the same reference numerals as those of FIG. 1 designate the same elements as those of FIG. 1, respectively.

The second embodiment is different from the above-discussed first embodiment only in that reflective portions 15 and 16 are provided correspondingly to light source portions 13 and 14 to reflect light from the light source portions 13 and 14 toward the side of image information, and not only light source portions 13 and 14 but also reflective portions 15 and 16 are disposed at asymmetrical locations with respect to the optical axis S of an image forming lens 8 in the sub-scanning cross-sectional plane, respectively. Other structure and optical operation of the second embodiment are approximately the same as those of the first embodiment, and the same technical advantages are likewise achieved.

In the second embodiment, each of the two light source portions 13 and 14 is comprised of an elongate illuminating light source with a small diameter and without an opening portion, such as a cold cathode-ray tube, and the reflective portions 15 and 16 are provided partially surrounding the light source portions 13 and 14 to increase the amount of illumination light respectively. In the second embodiment, the light source portions 13 and 14 and the reflective portions 15 and 16 are disposed at asymmetrical locations with respect to the optical axis S of the image forming lens 8 in the sub-scanning cross-sectional plane, respectively. Each of the reflective portions 15 and 16 of this embodiment is comprised of a concave mirror, an aspherical reflective mirror, or the like.

In the second embodiment, simultaneously-radiated light from the two light source portions 13 and 14 directly illuminate the original 1, and light from the light source portions 13 and 14 can also illuminate the original 1 through the reflective portions 15 and 16, respectively. Therefore, the amount of illumination light is further increased as compared with the first embodiment.

In the second embodiment, the light source portions 13 and 14 and the reflective portions 15 and 16 are disposed such that the position of the light source portion 14 and light illuminating the original 1 from the side of the reflective portion 16 are away from a path along a specular reflection a direction relative to an incident angle α on the original 1 of illumination light X from the light source portion 13 and the side of the reflective portion 15. Accordingly, reflection light Y of a weak reflective component but not reflection light W of a strong reflective component reflected in the specular reflection a direction by the original 1, enters the light source portion 14 and the side of the reflective portion 16. This incident light is diffused, and light Z of the diffused light illuminates the original 1 once again. Therefore, the amount of light influencing the reflective illumination can be reduced.

It is likewise possible to reduce the amount of light influencing the reflective illumination since the light source portion 13 and the reflective portion 15 are not positioned in a path along a specular reflection direction of illumination light illuminating the original 1 from the light source portion 14 and the side of the-reflective portion 16.

Further, in the second embodiment, it is possible to reduce a component which once enters the other light source portion and the side of the other reflective portion from one light source portion and one reflective portion and then illuminates the original 1 once again. Accordingly, it is also possible to reduce light which again enters the one light source portion and the side of the one reflective portion, and becomes a reflective illumination component, and hence adverse influence of the reflective illumination can be further reduced.

Further, in the second embodiment, two light source portions 13 and 14 are simultaneously lighted, the reflective portions 15 and 16 are used as discussed above to increase the amount of illumination light, and at the same time the reflective illumination is reduced. Image information of the original 1 is thus read with high precision.

Furthermore, in the second embodiment, illumination directions of the two reflective portions 15 and 16 corresponding to the two light source portions 13 and 14 are optimized according to the respective light source portions to increase the amount of illumination light, but the optimized arrangement is not limited thereto. For example, it is possible to independently optimize directions and shapes of the reflective portions according to the asymmetrical locations of the light source portions with respect to the optical axis to increase the amount of illumination light.

As described in the foregoing, in the second embodiment, the reflective portions 15 and 16 as well as the light source portions 13 and 14 are asymmetrically disposed with respect to the optical axis S. Accordingly, the amount of illumination light can be increased, and at the same time the influence of the reflective illumination can be reduced. Image information of the original 1 can hence be read with high precision.

Although both the light source portions 13 and 14 and the reflective portions 15 and 16 are asymmetrically disposed with respect to the optical axis S in the second embodiment, only the light source portions 13 and 14, or the reflective portions 15 and 16 can be asymmetrically disposed.

As described in the foregoing, according to the present invention, plural light source portions (and/or reflective portions) are asymmetrically disposed with respect to the optical axis of the image forming unit in the sub-scanning cross-sectional plane. Accordingly, the amount of illumination light can be increased, and at the same time the influence of the reflective illumination can be reduced. Hence, it is possible to provide image reading apparatuses in which image information of an original can be read with high precision.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus which includes illuminating means for illuminating image information of an original placed on an original support, image forming means for forming an image of the image information on reading means, and two-dimensionally reads the image information by changing a relative position between the image information and the reading means, wherein said illuminating means includes a first light source portion and a second light source portion; and a first reflective portion and a second reflective portion each of which is provided corresponding to said first and second light source portions and adapted to reflect light from said first and second light source portions toward a side of the image information, respectively, and wherein the first and second reflective portions are disposed asymmetrically with respect to an optical axis of said image forming means in a sub-scanning cross-sectional plane so that a specular reflection light having been emitted from the first light source portion and reflected on the original is not incident on the second light source portion and a specular reflection light having been emitted from the second light source portion and reflected on the original is not incident on the first reflective portion.

2. An image reading apparatus according to claim 1, wherein the first and second light source portions are disposed asymmetrically with respect to the optical axis of the image forming means in the sub-scanning cross-sectional plane so that the specular reflection light having been emitted from the first light source portion and reflected on the original is not incident on the second light source portion and the specular reflection light having been emitted from the second light source portion and reflected on the original is not incident on the first light source portion.

* * * * *